United States Patent [19]

D'Atre et al.

[11] 4,088,935
[45] May 9, 1978

[54] STABILIZING SCHEME FOR AN A-C ELECTRIC MOTOR DRIVE SYSTEM

[75] Inventors: John Douglas D'Atre, Erie, Pa.; Allan Barr Plunkett, Scotia, N.Y.

[73] Assignee: General Electric Company, Erie, Pa.

[21] Appl. No.: 729,441

[22] Filed: Oct. 4, 1976

[51] Int. Cl.$^2$ .............................................. H02P 5/40
[52] U.S. Cl. .................................... 318/227; 318/230; 318/231
[58] Field of Search ......................... 318/227, 230, 231

[56] References Cited
U.S. PATENT DOCUMENTS 4,023,083  5/1977  Plunkett .............................. 318/227

*Primary Examiner*—Herman J. Hohauser
*Attorney, Agent, or Firm*—Albert S. Richardson, Jr.

[57] ABSTRACT

For use with an adjustable speed a-c electric motor comprising a stator having effective direct and quadrature axes and a rotor spaced from the stator by a gap, said stator including windings adapted to be connected to a source of excitation of variable frequency and amplitude, a scheme is provided that comprises means for deriving a "torque angle" feedback signal representative of the phase angle between current and flux that interact in the motor to develop electromagnetic torque tending to move the rotor relative to the stator, in combination with means responsive to the torque angle feedback signal for controlling the source of excitation so as to control the frequency of stator excitation as a function of the torque angle feedback signal. In one aspect of the invention, means is provided for controlling the source of excitation so as to control the amplitude of stator excitation as a function of a variable command signal that is prevented from deviating below a predetermined limit. In another aspect of the invention, the torque angle feedback signal deriving means comprises phase discriminating means arranged to produce a signal representative of the complement of the electrical phase displacement between first and second periodic signals, the first periodic signal being synchronized with the fundamental component of the actual flux produced across the stator-rotor gap in a predetermined one of said stator axes and said second periodic signal being synchronized with the fundamental stator winding current in the other stator axis.

14 Claims, 10 Drawing Figures

4,088,935

STABILIZING SCHEME FOR AN A-C ELECTRIC MOTOR DRIVE SYSTEM

CROSS REFERENCE TO RELATED APPLICATION

This invention is related to U.S. patent application Ser. No. 729,042 filed concurrently herewith for J. D. D'Atre, T. A. Lipo, and A. B. Plunkett and assigned to the General Electric Company.

BACKGROUND OF THE INVENTION

This invention relates generally to a scheme for stabilizing the operation of an adjustable speed a-c electric motor that is driven by static electric power conversion apparatus. More particularly, the invention relates to method and apparatus for stabilizing the operation of a current fed induction motor drive system, and it is also applicable to voltage fed induction motors and to drive systems employing synchronous or synchronous-reluctance motors.

The background of this invention is the same as the "Background of the Invention" set forth in the above-reference concurrently filed patent application Ser. No. 729,042, which application is incorporated herein by reference in its entirety. That application discloses an improved a-c motor stabilizing scheme comprising suitable means for deriving an angle feedback signal representative of the actual phase angle between electric current and electromagnetic flux that interact to produce torque in the motor when excited and means responsive to the angle feedback signal for controlling the power conversion apparatus so as to control the stator excitation frequency of the motor as a function of the angle feedback signal.

SUMMARY OF THE INVENTION

A general object of the present invention is to provide means for improving the performance of the above-summarized stabilizing scheme when the motor drive system is running with zero torque.

A further object of the invention is the provision, in a stabilizing scheme similar to the one claimed in the concurrently filed application, of an alternative angle processing means for deriving the angle feedback signal.

In carrying out our invention in one form, first means is provided for deriving from an a-c electric motor an angle feedback signal representative of the actual phase angle between current and magnetic flux that interact in the motor to develop an electromagnetic torque tending to move the rotor of the motor relative to the stator when excited, and the angle feedback signal is supplied to second means for controlling the excitation source of the motor as a function of the angle feedback signal. Preferably the excitation source comprises electric power conversion apparatus that supplies a-c power of variable frequency and amplitude to the windings on the motor stator, and the second means is arranged to control that frequency. In accordance with the present invention, additional means is provided for controlling the conversion apparatus so as to control the amplitude of a-c power supplied to the stator windings as a function of a variable command signal, and the additional means includes means for preventing any deviation of the command signal below a predetermined minimum limit. This will prevent the excitation amplitude from falling below a certain minimum level when the motor is operating at zero torque, thereby advantageously avoiding the loss of the angle feedback signal under such conditions.

In another aspect of the present invention, the aforesaid first means comprises means for deriving a first periodic signal synchronized with the fundamental component of the actual flux produced across the air gap between the stator and the rotor of the motor in a predetermined axis of the stator, means for deriving a second periodic signal synchronized with the fundamental stator winding current in another stator axis disposed effectively in quadrature with said predetermined axis, and phase discriminating means responsive to the first and second periodic signals for producing a signal (the angle feedback signal) representative of the complement of the electrical phase displacement between said periodic signals.

The invention will be better understood and its various objects and advantages will be more fully appreciated from the following description taken in conjunction with the accompanying drawings.

BRIEF DESCRIPTION OF THE DRAWINGS

Referring now to FIG. 1, our invention is shown embodied in an adjustable speed motor drive system basically comprising the combination of electric power conversion apparatus 11 and an adjustable speed a-c motor 12 having 3-phase star-connected stator windings that are connected for energization to the polyphase output of the conversion apparatus and a rotor coupled to a mechanical load such as the wheels of a traction vehicle (not shown). The apparatus 11 is suitably constructed and arranged to supply a-c power of variable frequency and amplitude to the stator windings of the motor 12. In its preferred embodiment, the conversion apparatus 11 has a front end comprising a controlled d-c power supply 13 adapted to be connected to an electric energy source (not shown), a back end comprising a variable frequency static electric power inverter 14 having d-c and a-c terminal sets, and a d-c link 15 interconnecting the d-c terminal set of the inverter 14 and the d-c terminals of the power supply 13. These more or less conventional parts of the illustrated motor drive system will now briefly described , and following that description the concept and preferred implementation of our invention will be explained in detail. At the outset, however, it should be understood that our invention serves the primary purpose of stabilizing the operation of the motor 12, and it can be advantageously used for this purpose in motor drive systems different than the particular one illustrated in FIG. 1.

Figure 1:
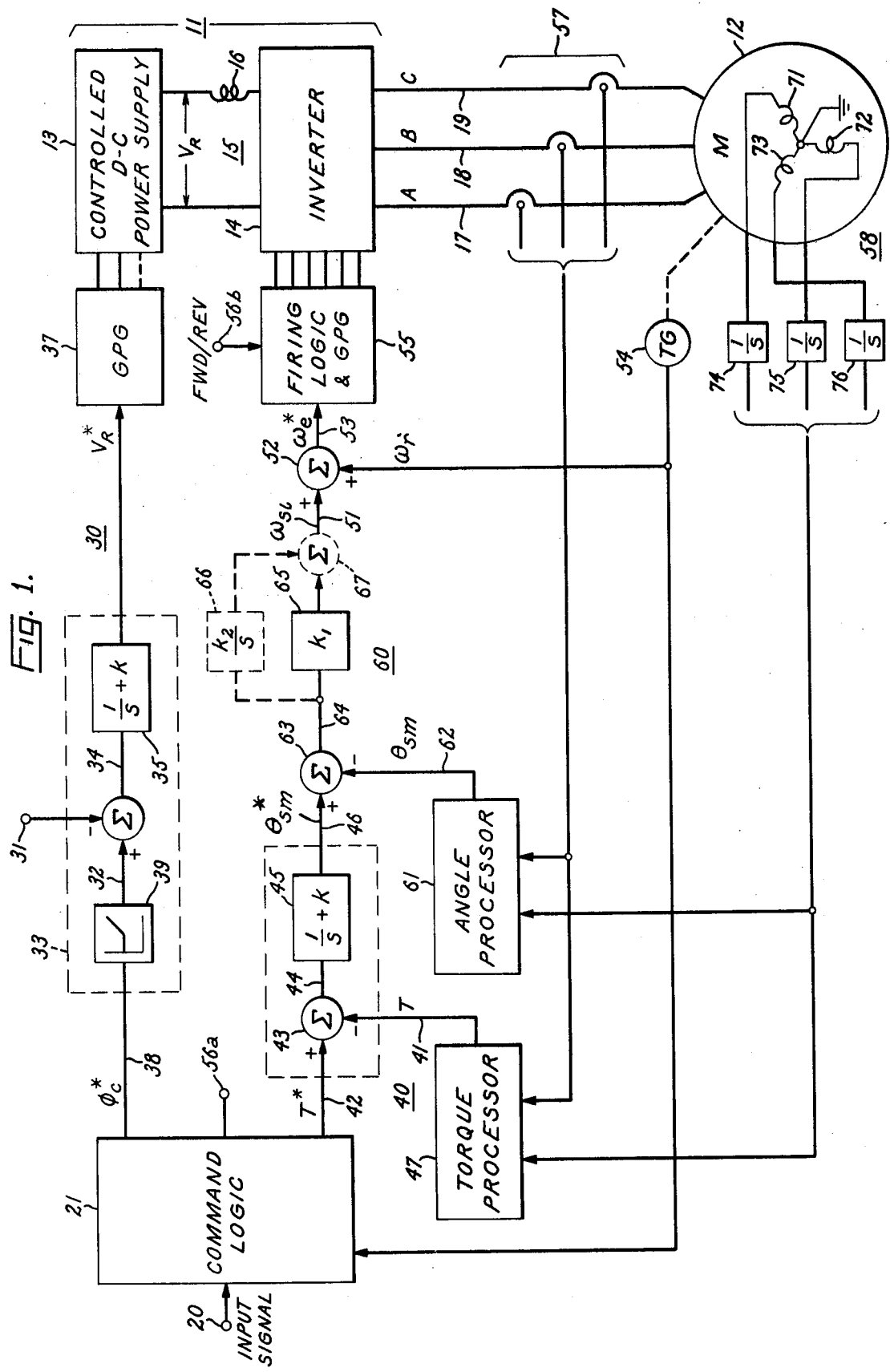
FIG. 1 is a functional block diagram illustrating an adjustable speed a-c electric motor drive system embodying our invention.

The d-c power supply 13 can take any one of a variety of known forms, such as, for example, a d-c/d-c chopper whose input terminals are coupled to an uncontrolled d-c source, a phase controlled rectifier circuit coupled to fixed frequency a-c mains, and an uncontrolled rectifier coupled to a variable alternating voltage source. By varying the duty cycle of the chopper or the firing angle of the electric valves forming the phase controlled rectifier circuit or the voltage amplitude of the alternating voltage source, as the case may be, the average magnitude of the unipolarity output voltage $V_R$ that the power supply 13 impresse s on the d-c link 15 can be varied as desired. The d-c link 15 includes a suitabe filter, shown in FIG. 1 as a simple inductor or choke 16, for smoothing the undulating direct current flowing between the power supply 13 and the inverter 14, whereby controlled magnitude direct current is supplied to the inverter 14. This results in a current fed a-c motor drive system. In such a system the d-c power supply 13 will be suitably arranged to accommodate a polarity reversal of the unipolarity voltage $V_R$ in the event of electric braking which is an operating mode wherein the motor 12 is driven by the inertia of its mechanical load and consequently serves as a generator delivering electric power to the front end of the conversion apparatus 11.

The inverter 14 may comprise any suitable conventional inverter. In the presently preferred embodiment of our invention, it is particularly advantageous to use a 3-phase auto-sequential commutated inverter; an improved form of such an inverter is disclosed and claimed in U.S. Pat. No. 3,980,941 granted to R. F. Griebel and assigned to the General Electric Company. The respective terminals of the 3-phase a-c terminal set of the inverter 14 are connected by way of three alternating current conductors or lines 17, 18, and 19 to the corresponding terminals of the 3-phase stator windings of the motor 12, and the inverter is operative to switch the d-c link current in sequence between the respective phases of the stator windings.

The motor 12 may be selected from a variety of conventional types known generally as induction, synchronous, and synchronous-reluctance, and it can be either round or linear. A round induction motor is assumed in the present description, it being understood that if a synchronous motor were used the source of excitation would additionally include suitable means for supplying direct current to the field windings. The motor drive system may comprise a single motor 12 as shown, or alternatively it may comprise a plurality of such motors, in which event separate inverters and d-c links may be provided for connecting the respective motors in parallel to a shared d-c power supply. While a 3-phase motor has been shown, the number of phases is not critical, and motors having single, double, six, or more phases can be alternatively used if desired.

Figure 2A:
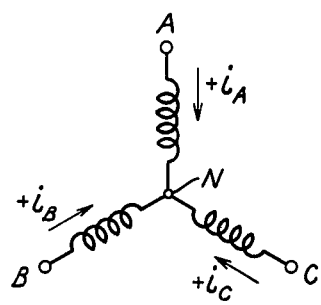
FIGS. 2A and 2B are, respectively, schematic diagrams of the stator windings and of the stator current waveforms in the 3-phase motor illustrated in FIG. 1.
Figure 2B:
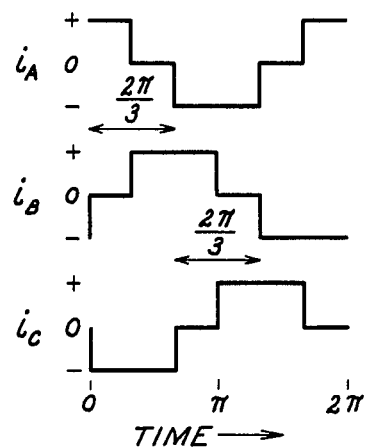

The 3-phase stator windings of the illustrated motor 12 are shown schematically in FIG. 2A. Each winding comprises a plurality of main coils that are conventionally distributed in slots around the stationary magnetizable core of the motor and that are electrically connected between a neutral bus N and the associated phase (A, B, or C) of the 3-phase power lines 17–19. The alternating currents $i_A$, $i_B$, and $i_C$ exciting the respective phases the stator windings during one full cycle of operation are illustrated in FIG. 2B wherein the commutation intervals are idealized and ripple is neglected. It will be seen that a symmetrically staggered phase sequence A-B-C is assumed. In each phase the fundamental stator winding excitation current has an amplitude determined by the magnitude of current in the d-c link 15 of the conversion apparatus and a frequency determined by the fundamental switching frequency of the electric values in the inverter 14.

By appropriately controlling the motor excitation, the load that is driven by the motor 12 can be propelled (motoring mode) or retarded (braking mode, in which the motor operates as a generator) in either forward or reverse directions as desired. Preferably the excitation control is exercised by varying the frequency, the current amplitude, and the phase sequence of the polyphase a-c power that the conversion apparatus 11 supplies to the stator of the motor 12. Toward this end, suitable means is provided for regulating and controlling the operation of the conversion apparatus in programmed response to an operator controlled input signal and to certain feedback signals. The input signal is applied to an input terminal 20 of a command logic module 21 and is representative of a desired motor torque or horsepower. The feedback signals are representative of the actual motor responses, as is more fully explained below.

The control means shown in FIG. 1 comprises a pair of outer regulating loops 30 and 40. The first outer loop 30 exerts control over the amplitude of stator winding current in a manner to regulate the magnitude of stator excitation, whereas the second outer loop 40 exerts control over the frequency of stator winding current in a manner to regulate motor torque. The second loop 40 includes an inner loop 60 for stabilizing purposes.

The first outer loop 30 regulates the stator excitation of the motor 12 by so adjusting the average magnitude of the voltage $V_R$ impressed on the d-c link 15, which magnitude in turn determines the magnitude of link current and hence the amplitude of the fundamental stator winding current, as to minimize the error between an excitation magnitude feedback signal applied to a terminal 31 and a variable command signal on line 32. This loop comprises a control circuit 33 in which the feedback and command signals are compared at a summing point to derive, on line 34, an error signal that reflects any difference therebetween. As is shown in FIG. 1, the error signal on line 34 is processed by a conventional gain network 35 having integral plus proportional transfer characteristics, whereby a zero steady-state error can be obtained. From the gain network 35 a compensated signal $V^*_R$ is derived and fed over a line 36 to suitable control means 37 for the controlled d-c power supply 13.

The control means 37, labeled GPG (gate pulse generator) in FIG. 1, controls the operation of the d-c power supply 13 and determines the average magnitude of the d-c link voltage $V_R$ in accordance with the compensated signal $V^*_R$. It will be apparent that the first regulating loop 30 responds to any error between the excitation magnitude feedback signal applied to terminal 31 and the command signal on line 32 to vary $V_R$ in a corrective sense, thereby increasing or decreasing the fundamental amplitude of stator winding current as necessary to reduce the value of the error to zero. The excitation magnitude feedback signal is intended to be representative of the actual level of excitation in the stator of motor 12. For example, it can be a measure of the average magnitude of the actual flux produced across the stator-rotor gap in the motor 12 when excited, in which case this feedback signal is preferably derived from the flux feedback signals available in the circuit shown in FIG. 9 as described hereinafter. The command signal on line 32 is derived from a control signal $\phi^*_C$ representing the desired magnitude of stator excitation, as determined by the command logic module 21. This control signal is supplied to the circuit 33 on line 38, and in accordance with our invention a limiter 39 is included between lines 38 and 32 to prevent any deviation of the command signal on line 32 below a predetermined minimum limit.

The second outer loop 40 regulates the motor torque by so adjusting the fundamental switching frequency of the inverter 14, which frequency determines the frequency of the fundamental stator winding current, as to minimize any difference between a torque feedback signal T on line 41 and a variable control signal T* (representing a desired motor torque) on line 32. This loop comprises a control circuit 43 in which the feedback and control signals are compared to derive, on a line 44, an error signal that reflects any difference therebetween.

The error signal on line 44 is processed by another gain network 45 having an integral plus proportional transfer characteristic, whereby a zero steady-state error can be obtained. The gain network 45 provides on a line 46 a command signal $\theta 0_{sm}$ for the inner motor stabilizing loop 60, which signal varies as a function of the control signal T* and will tend to assume whatever value results in reducing the error between T* and T to zero. For reasons and in a manner soon to be described, the inner loop 60 is responsive to the command signal on line 46 and supplies, on a line 51, an appropriate signal that preferably is combined at a summing point 52 with a motor speed feedback signal $\omega_r$ to derive, on line 53, an excitation frequency control signal $\omega^*_e$ representative of their algebraic sum. The speed feedback signal $\omega_r$ is produced by suitable means, such as a tachometer generator 54, for sensing the actual angular velocity of the rotor of the motor 12. (This signal is also fed back to the command logic module 21.) The excitation frequency control signal $\omega^*_e$, which differs from $\omega_r$ in an amount and in a sense determined by the value of the signal on line 51, is fed over line 53 to suitable control means 55 for the inverter 14. The control means 55 is operative to determine the fundamental switching frequency of the inverter 14, and hence the fundamental frequency of the stator winding current, in accordance with the value of $\omega^*_e$. Since the value of $\omega^*_e$ corresponds to the stator excitation frequency and the value of $\omega_r$ corresponds to the equivalent electrical frequency of the actual motor speed, the signal on line 51 represents motor slip frequency $\omega_{sl}$.

The inverter control means 55, labeled "Firing Logic & GPG" in FIG. 1, is suitably constructed and arranged to supply to the respective electric valves in the inverter 14 a family of gate pulses that will fire the valves in a predetermined sequence and at a fundamental frequency determined by the value of the excitation frequency control signal $\omega^*_e$. The stator current conducting intervals of the inverter valves are thus initiated every cycle in a staggered pattern that results in waveforms similar to those shown in FIG. 2B where it can be observed that the intervals associated with phases B and C of the windings are phase displaced with respect to the phase A intervals by one-third and two-thirds, respectively, of a full cycle of fundamental frequency. The phase sequence, and hence the direction of rotation of the motor 12, corresponds to the sequencing of the gate pulses and is practically determined by a forward-/reverse command signal derived from the command logic module 21 (terminal 56a) and applied to the inverter control means 55 (terminal 56b).

It will now be apparent that the outer regulating loop 40 responds to any difference between the torque feedback signal T on line 41 and the control signal T* on line 42 to vary the switching frequency of the inverter valves in a corrective sense, thereby increasing or decreasing the stator excitation frequency as necessary to reduce the value of the difference to zero. The control signal T* is provided by the command logic module 21, and its value is determined in accordance with a predesigned schedule that will enable the motor to exhibit desired speed-torque characteristics. (Ordinarily the module 21 will be arranged to coordinate the value of the control signal $\phi^*_c$ with the value of the control signal T*.) The torque feedback signal T on line 41 is intended to be representative of the actual magnitude and relative direction of the torque in the rotor of the motor 12 when excited. It can be derived from the motor by any suitable means.

Preferably the torque feedback signal T is obtained from an improved torque processing circuit 47 that is constructed and arranged in accordance with the teachings of a co-pending U.S. patent application Ser. No. 568,120 filed for A. B. Plunkett on Apr. 14, 1975, and assigned to the General Electric Company (now U.S. Pat. No. 4,023,083). As is therein explained more fully, this component relies on stator excitation current feedback signals derived from an array of three current transformers 57 coupled to the respective a-c power lines 17, 18, and 19, and it also relies on motor flux feedback signals derived from suitable means 58 for sensing the actual electromagnetic flux across the rotor-stator gap inside the motor 12. The flux sensing means 58 is advantageously constructed in accordance with the teachings of a co-pending patent application Ser. No. 525,613 filed for A. B. Plunkett and J. P. Franz on Nov. 20, 1974, and assigned to the General Electric Company (now U.S. Pat. No. 4,011,489). The disclosures of both of the co-pending applications cited in this paragraph are incorporated herein by reference.

As is more fully disclosed by Plunkett and Franz, the flux sensing means 58 comprises a plurality of multi-turn coils 71, 72, and 73 mounted proximate to the main coils of the stator windings in preselected stator slots so as to sense the actual flux produced across the gap between the stator and the rotor of the motor 12 when the stator is excited, whereby each sensing coil has induced therein voltage signals substantially proportional to the rate of change of flux across the adjacent sector of the stator-rotor gap, and a plurality of integrating circuits 74, 75, and 76 respectively connected to the aforesaid sensing coils so as to produce flux feedback signals that are time integrals of the induced voltage signals, whereby both magnitude and phase of the actual stator-rotor gap flux are truly represented by the flux feedback signals. Preferably the coils 71, 72, and 73 are positioned around the stator-rotor gap in alignment with the centers of flux belts associated with the main coils of the respective phases A, B, and C of the stator windings. In such an arrangement the flux feedback signals derived by the actual flux sensing means 58 are representative of $\psi_{mA}$, $\psi_{mB}$, and $\psi_{mC}$, respectively, where the symbol "$\psi$" stands for flux in units of volts (equal to the product of flux linkages $\lambda$ and base frequency $\omega_b$) and the subscript "m" denotes the mutual value of the principal quantity (i.e., the value of flux crossing the stator-rotor air gap and therefore linking both rotor and stator windings). Each of these signals is an alternating quantity having a waveform that is generally sinusoidal and a frequency that equals the fundamental frequency of the stator magnetomotive force (MMF).

Figure 3:
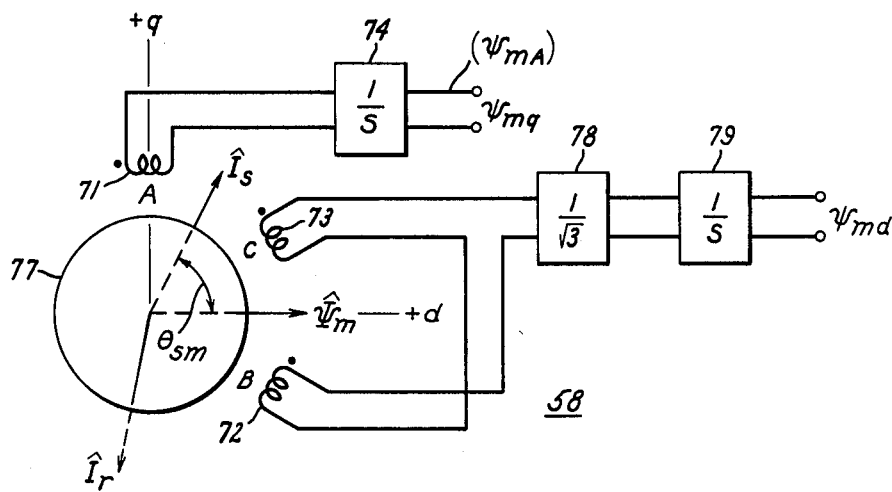
FIG. 3 is a schematic representation of the motor rotor showing vectors that respectively represent rotor and stator currents and air gap flux and also showing a set of three coils for sensing the flux across three different sectors of the air gap.

For the sake of simplifying an analysis of the steady-state and transient performance of the above-described balanced 3-phase motor drive system, the actually sensed 3-phase a-c quantities can be transformed into equivalent 2-phase variables along two perpendicular axes, respectively referred to as the direct (d) axis and the quadrature (q) axis. In the illustrated system, as is indicated in FIG. 3 (where the circle 77 represents the perimeter of the motor rotor), the quadrature axis of the stator is arbitrarily chosen to coincide with the centerline of the flux belt of the phase A stator winding on one pole of the motor, and this axis is disposed 90° ahead of the effective $d$ axis of the stator in the forward direction of rotation. In this case the quadrature axis component $\psi_{mq}$ of the 3-phase stator-rotor gap flux is represented by the phase A flux feedback signal ($\omega_{mA}$), whereas the direct axis component $\psi_{md}$ can be readily deduced or derived in any one of a variety of different ways.

One way to obtain the direct axis component of air gap flux is to use the actual flux signal processing circuit means disclosed in the above-referenced co-pending patent application Ser. No. 568,120 (see also FIG. 9 of the present application), which means is operative to sum the aforesaid phase C flux feedback signal ($\psi_{mC}$) with the negative of the phase B flux feedback signal ($\psi_{mB}$) and to supply the difference through a circuit (shown at 117 in FIG. 9) that introduces a constant proportionality factor equal to $(1/\sqrt{3})$. In other words, $\psi_{md} = (\psi_{mC} - \psi_{mB})/\sqrt{3}$. Another way to achieve the same result has been illustrated in our FIG. 3 where the voltage signals induced in the flux sensing coils 72 and 73 are combined in polarity opposition and then supplied through a component 78 having a gain of $(1/\sqrt{3})$ to an integrator 79 whose output consequently is representative of $\psi_{md}$. FIG. 3 shows the three flux sensors 71, 72, and 73 positioned on the magnetic axes of the respective stator phases A, B, and C. Alternatively, $\psi_{md}$ could be taken from the integrated output of a sensing coil that is so positioned in the motor as to sense the actual flux in a sector of the stator-rotor gap that is intersected by the effective $d$ axis of the stator where the flux wave leads $\psi_{mA}$ by 90 electrical degrees. It should be noted here that if the phase A flux sensing coil 71 were not physically aligned with the phase A magnetic axis, $\psi_{mA}$ and $i_A$ can nevertheless be electrically aligned with one another (in the quadrature axis of the stator) by adding appropriate electrical phase shifting means in the secondary circuits.

It will be apparent that the components $\psi_{md}$ and $\psi_{mq}$ are alternating quantities whose instantaneous magnitudes and relative polarities vary sinusoidally in accordance with the projections on the $d$ and $q$ axes, respectively, of a single vector $\vec{\Psi}_m$ that has a constant steady-state magnitude (equal to the square root of the sum of the squares of $\omega_{md}$ and $\psi_{mq}$) and that rotates around the stator-rotor gap in synchronism with the stator MMF at a speed corresponding to the fundamental stator excitation frequency. FIG. 3 shows the resultant vector $\vec{\Psi}_m$ at a particular moment of time when it coincides with the $d$ axis of the stator, which moment will be considered a reference time $t=0$. Normally, under steady-state conditions, $\psi_{md}=\Psi_m\cos\omega t$ and $\psi_{mq}=\Psi_m\sin\omega t$, it being recognized that transiently the time displacement between these components may differ from 90 electrical degrees. $\vec{\Psi}_m$ is a vector representation of the total stator-rotor gap flux.

In a similar manner, the quadrature axis component $i_{qs}$ of the stator excitation current is the same as the phase A stator winding current $i_A$, whereas the direct axis component $i_{ds}$ of current is provided by the quantity $(i_C-i_B)/\sqrt{3}$. These two component currents could produce exactly the same magnetic fields in the motor as the actual 3-phase currents. Their resultant vector $\vec{I}_s$ in the synchronously rotating reference frame has been shown in FIG. 3 for a typical forward motoring condition at rated load. In this mode the total stator current vector $\vec{I}_s$ leads the total stator-rotor gap flux vector $\vec{\Psi}_m$ by a positive angle $\theta_{xm}$ due to load current $\vec{I}_r$ in the shorted conductors (bars or windings) of the motor rotor, it being well known that flux in the stator-rotor gap is the result of both stator and rotor currents. The fundamental direct and quadrature components of stator current can be respectively expressed $i_{ds}=I_s\cos(\omega t+\theta_{sm})$ and $i_{qs}=I_s\sin(\omega t+\theta_{sm})$.

Figure 4:
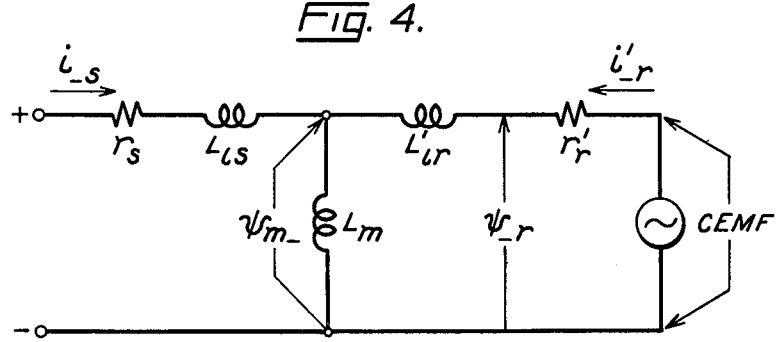
FIG. 4 is a simplified equivalent circuit diagram of a typical a-c induction motor.

Conventional $d$-$q$ axes equivalent circuits of the induction motor 12 will now be set forth with the aid of FIG. 4 which universally applies to both the $d$-axis and the $q$-axis circuits. Parameters common to both circuits are designated in FIG. 4 by the symbols listed below (primes signifying rotor values referred to the stator by the motor turns ratio):

1 $r_s$—stator resistance
$L_{ls}$—stator leakage inductance
$L_m$—mutual inductance of stator windings and rotor conductors (referred to the stator)
$L'_{lr}$—rotor leakage resistance
$r'_r$—rotor resistance The other quantities identified in FIG. 4 are more specifically defined in the following table:

| Quantity | d-axis circuit | q-axis circuit |
|---|---|---|
| stator current | $i_{ds}$ | $i_{qs}$ |
| rotor current | $i'_{dr}$ | $i'_{qr}$ |
| stator-rotor gap flux mutually linking stator and rotor | $\psi_{md}$ | $\psi_{mq}$ |
| flux linking rotor conductors | $\psi'_{dr}$ | $\psi'_{qr}$ |
| counter electromotive force (CEMF) | $-\dfrac{\omega_r}{\omega_b}\psi'_{qr}$ | $\dfrac{\omega_r}{\omega_b}\psi'_{dr}$ |

In operation, interacting currents and flux in the motor will develop electromagnetic force (torque) tending to move the rotor relative to the stator and hence to drive the mechanical load that is coupled to the motor shaft. As is more fully explained in Fitzgerald and Kingley's classic textbook *Electric Machinery* (McGraw-Hill Book Co., New York, N.Y. 2d, 1961, pp 285–95), this torque is due to the superimposed interactions of the d-axis magnetic field crosscoupled with q-acis MMF and the $q$-axis magnetic field cross-coupled with $d$-axis MMF. Its strength can be shown to be $K(\psi_{mod}{}^j{}_{qs} - \psi_{mq}{}^i{}_{ds})$, where K is a constant equal to $3Q/4\psi_b$, P being the number of poles in the stator of the motor. This is the same as K times the cross product of the vectors $\hat{I}_s$ and $\hat{\Psi}_m$, i.e., $K(\hat{I}_s \times \hat{\Psi}_m)$. In other words, the magnitude and relative direction of torque is dependent on the product of the magnitudes of the interacting current and flux vectors multiplied by the sine of the phase angle therebetween. Alternative expressions for the instantaneous motor torque are written below, it being understood that the subscripts r and s denote rotor and stator quantities, respectively, and that the identified vector representations of current and flux in each case have $d$ and $q$ axes components in the synchronoulsy rotating reference frame. (It should be further understod that these expressions apply to symmetrical induction motors and would be somewhat modified to apply to salient pole a-c motors.)

Figure 5:
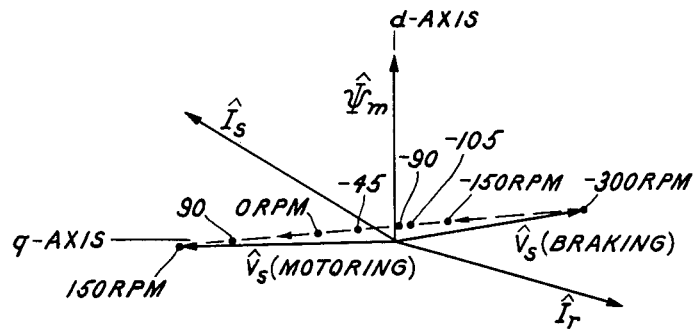
FIG. 5 is a vector diagram showing changes in the stator terminal voltage vector during a motor speed reversal with constant load.
Figure 6:
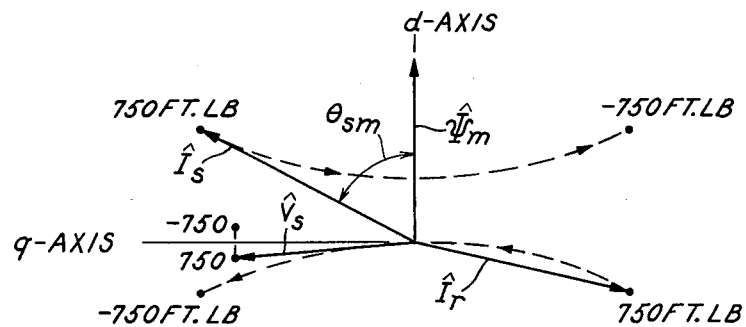
FIG. 6 is a vector diagram showing changes in the stator and rotor current vectors with changing load at constant speed.

$K(\hat{\Psi}_m \times \hat{I}_r)$
$K(\hat{\Psi}_s \times \hat{I}_r)$
$K(\hat{I}_s \times \hat{\Psi}_r)$
$K(\hat{I}_r \times \hat{\Psi}_r)$ Analysis of the $d$-$q$ axes equivalent circuits enables the interrelated motor variables to be conveniently portrayed by the vector diagrams shown in FIGs. 5 and 6, wherein stator-rotor gap flux vector $\hat{\Psi}_m$ is used as a reference. In particular, FIG. 5 shows the locus of the stator terminal voltage vector $\hat{V}_s$ for a transition through zero speed from braking to motoring modes of a typical adjustable speed induction motor while maintaining a relatively constant high output torque. It can be observed that this voltage vector varies widely in angle and magnitude as the motor decelerates from an initial speed of 300 RPM (which speed, for example, has an equivalent electrical frequency of 62.8 radians per second, or approximately 0.2 $\omega_b$) to zero speed and then accelerates to a new speed of 150 RPM. However, the stator current vector $\hat{I}_s$, which has also been shown in FIG. 5, stays relatively fixed during this same transition. Therefore a current fed a-c motor drive system, in which the angular relation between the vectors representing stator current and air gap flux depends on the inverter firing, achieves the correct flux-current vector alignment without difficulty for the conditions illustrated in FIG. 5.

FIG. 6 shows the loci of stator voltage and current vectors for a range of motor loads, at the base frequency $\omega_b$, from 750 footpounds motoring to $-750$ foot-pounds braking (generator action). At no load, the stator current vector is in phase with the flux vector and 90° out of phase with the stator terminal voltage vector. As the motor load (torque) increases, rotor current must be developed, and this in turn requires a counteracting component of stator current. FIG. 6 clearly shows the change in angular position of both the stator current vector and the rotor current vector $(\hat{I}_r)$ as a function of load.

Figure 7:
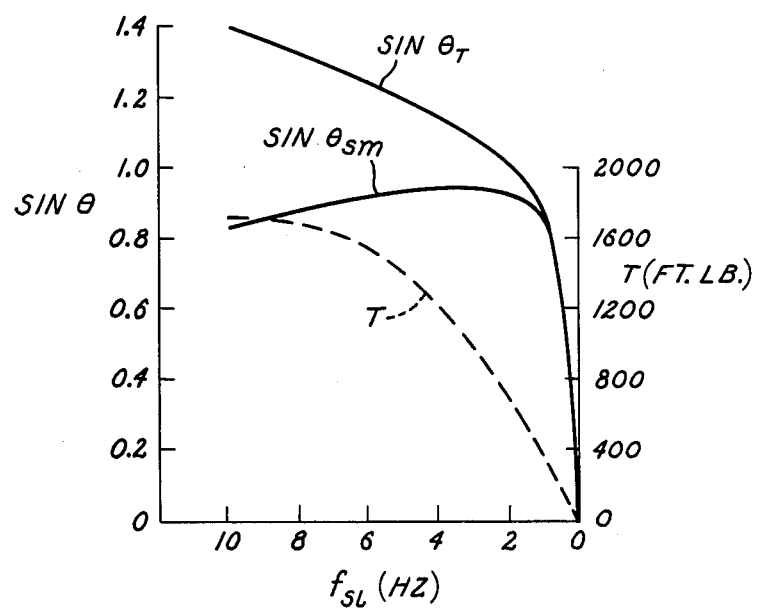
FIG. 7 is a graph showing the variations of torque and torque angle as a function of motor slip frequency.

It can be observed in FIG. 6 that the stator terminal voltage vector $\hat{V}_s$ does not significantly change position with load. This means that the relative phasing of the stator excitation voltage in a voltage fed a-c motor drive system need not vary with load changes. Furthermore, a voltage fed system, contrary to a current fed system, offers an inherent stabilizing action by supplying damping currents so that the motor is able to rapidly align to any align to any new operating condition without assistance from the inverter. On the other hand, it can be observed in FIG. 6 that the angle $\theta_{sm}$ of the stator current vector changes rapidly with load so that in the illustrated current fed a-c motor drive system, where the angular relation between stator current and gap flux is affected by the inverter firing, the inverter controls should be sensitive to load changes. To display the relationship between the motor output torque T and the sine of the angle $\theta_{sm}$, both of these variables have been plotted in FIG. 7 as functions of motor slip frequency $f_{sl}$ (in units of Hertz) for the forward motoring quadrant of operation with rated excitation magnitude.

In accordance with application Ser. No. 729,042, the stability of the illustrated motor drive system under conditions of changing load is enhanced and the transient behaviour of the system is generally improved by providing the above-mentioned inner loop 60 in the frequency control channel of the inverter 14 and by utilizing this loop to control the motor excitation as a function of the actual "torque angle" in the machine. By torque angle we mean the phase angle between two vectors that represent, respectively, the flux and currents that interact in the motor to develop an output torque. Because of its relative accessibility in the illustrated embodiment of the invention, the phase angle $\theta_{sm}$ between the stator current vector $\hat{I}_s$ and the statorrotor gap flux vector $\hat{\Psi}_m$ is taken as the torque angle. This angle is positive during motoring in the forward direction and negative during braking in the forward direction.

In its preferred embodiment, the stabilizing loop 60 is arranged so as to vary the stator excitation frequency as necessary to minimize the value of any error between a torque angle feedback signal representative of the actual phase angle $\theta_{sm}$ and the command signal $\theta^*_{sm}$ that represents a desired phase angle. As previously described, the latter signal itself varies in a corrective sense in response to any non-minimum error between the actual motor torque feedback signal T on line 41 and the desired torque control signal T * on line 32 in the outer regulating loop 40 shown in FIG. 1. For deriving the angle feedback signal, suitable torque angle processing means is coupled to the motor 12. The angle processing means is shown in block form at 61 in FIG. 1, and two different embodiments of it will soon be described with reference to FIGS. 8 and 9.

As is shown in FIG. 1, the angle feedback signal that is derived by the processor 61 is supplied over a line 62 to summing means 63 where it is combined with the desired angle command signal on line 46. In the summing means 63 these command and feedback signals are compared, and an error signal representative of their difference is derived. The error signal appears on a line 64 that is connected to the slip frequency line 51 by means of a gain circuit 65 having a proportional transfer characteristic. Thus the value of the slip frequency signal 107 $_{sl}$ is a function of any difference between the torque angle command and feedback signals. If desired, an integral transfer characteristic can be added between lines 64 and 51 by connecting another gain network 66 in parallel with the circuit 65 between the lines 64 and a summing point 67. This option enables a zero steadystate error to be obtained on line 64, and it should be used in systems that omit the tachometer generator 54 and that operate without a motor speed feedback signal $\omega_r$.

The operation of the stabilizing loop 60 will now be reviewed. It is first noted that the frequency of the current exciting the stator windings of the motor is determined by the fundamental switching frequency of the electric valves in the inverter 14 and that variations in the latter frequency will transiently shift the stator current conducting intervals and hence the relative phase position of the current vector $\hat{I}_s$. More particularly, when the excitation frequency is increasing the stator current vector is advancing in phase (i.e., the angle of this vector is increasing in the positive sense with respect to a predetermined reference position), and when the excitation frequency is decreasing the phase of the current vector is being retarded (i.e., the angle is decreasing in the same sense or increasing in the opposite sense with respect to the predetermined reference position). It will next be assumed that the value of the desired torque control signal T* applied to the motor torque regulating loop 40 is suddenly reduced a predetermined amount from its steady-state rated-load forward motoring point. This causes an abrupt decrease in the angle command signal $\theta^*_{sm}$ and a corresponding decrement in the angle error signal on line 64, which decrement in turn is reflected by a proportionate reduction in the slip frequency signal $\omega_{sl}$ on line 51 and consequently by a step decrease in the excitation frequency control signal $\omega^*_e$. The firing controls 55 of the inverter 14 respond to the last-mentioned decrease by lowering the inverter switching frequency, whereby the fundamental stator excitation frequency is lowered. This reduces the motor slip frequency and in the process retards the angular position of the stator current vector with respect to the stator-rotor gap flux vector (i.e., reduces te torque angle). As a result, both the torque feedback signal on line 41 and the angle feedback signal on line 62 decrease in value, and the fundamental stator excitation frequency quickly reaches equilibrium at a new operating point wherein equality exists between the actual torque feedback signal and the value of torque commanded by the reduced control signal T* in the outer torque regulating loop 40 and wherein no more than a minimum difference exists between the angle feedback signal and the new value of the angle command signal in the inner stabilizing loop 60.

In a manner similar to that described above for a step change in the commanded value of the torque angle, the inner loop 60 responds to random changes of the actual angle feedback signal (due to anomalies or disturbances of any kind in the motor or in is connected load) by initiating a corrective variation in the stator excitation, whereby the proper angle is immediately restored. This prevents the motor from exhibiting self-sustained oscillations about a steady-state operating point. In effect the actual angular position of the stator current vector is caused spontaneously to track the desired angle command signal $\theta^*_{sm}$, and the system becomes self-synchronizing. From another viewpoint, the torque angle regulating effect of the inner loop 60 can be said to synchronize the firing signals of the inverter 14 (i.e., the actual current switching moments) to the stator-rotor gap flux and hence to the motor counter EMF, whereby the hunting type of instability is eliminated.

The above-described stabilizing scheme has a number of important advantages that will now be briefly summarized. Since the system is stabilized by controlling motor excitation frequency as a function of the torque angle, the requirements are eased on the controlled d-c power supply 13 which is used merely to adjust the steady-state magnitude of excitation. Furthermore, the angle control will result in less erratic current flow in the d-c link 15 of the system, whereby the size and expense of the current smoothing filter 16 can be reduced, and considerably less critical link current regulation is required. Another advantage is that the effects of variable inverter commutation delay are attenuated by the gain within the angle regulating loop 60, thereby eliminating possible abnormal inverter communtation conditions.

The tachometer generator 54 is not essential to the satisfactory performance of our stabilizing scheme, and it can be omitted if desired. It has been included in the preferred embodiment of the invention to facilitate tracking of the motor speed by the control system in the event that electric power is initially applied to the stator windings while the rotor is in motion or if an operator calls for speed changes, but if an actual motor speed feedback signal were not available the angle regulating loop (with the gain network 66 in place) would nevertheless produce whatever excitation frequency control signal is required to minimize the error between the actual and desired values of the torque angle.

Two examples of specific circuits for deriving the torque angle feedback signal will next be described. In the illustrated embodiment of our invention the most convenient torque angle to measure is the angle $\theta_{sm}$ between the stator current vector and the stator-rotor gap flux vector. This is because practical means for sensing stator current and gap flux are presently available, which means preferably comprise the previously described array of current transformers 57 and the flux sensing means 58. It should be noted that the feedback signals from the latter means are desirably derived directly from the actual motor flux rather than being imputed or calculated from stator terminal quantities that would be subject to error due to motor parameters changing with temperature, with load conditions, and from motor to motor.

Figure 8:
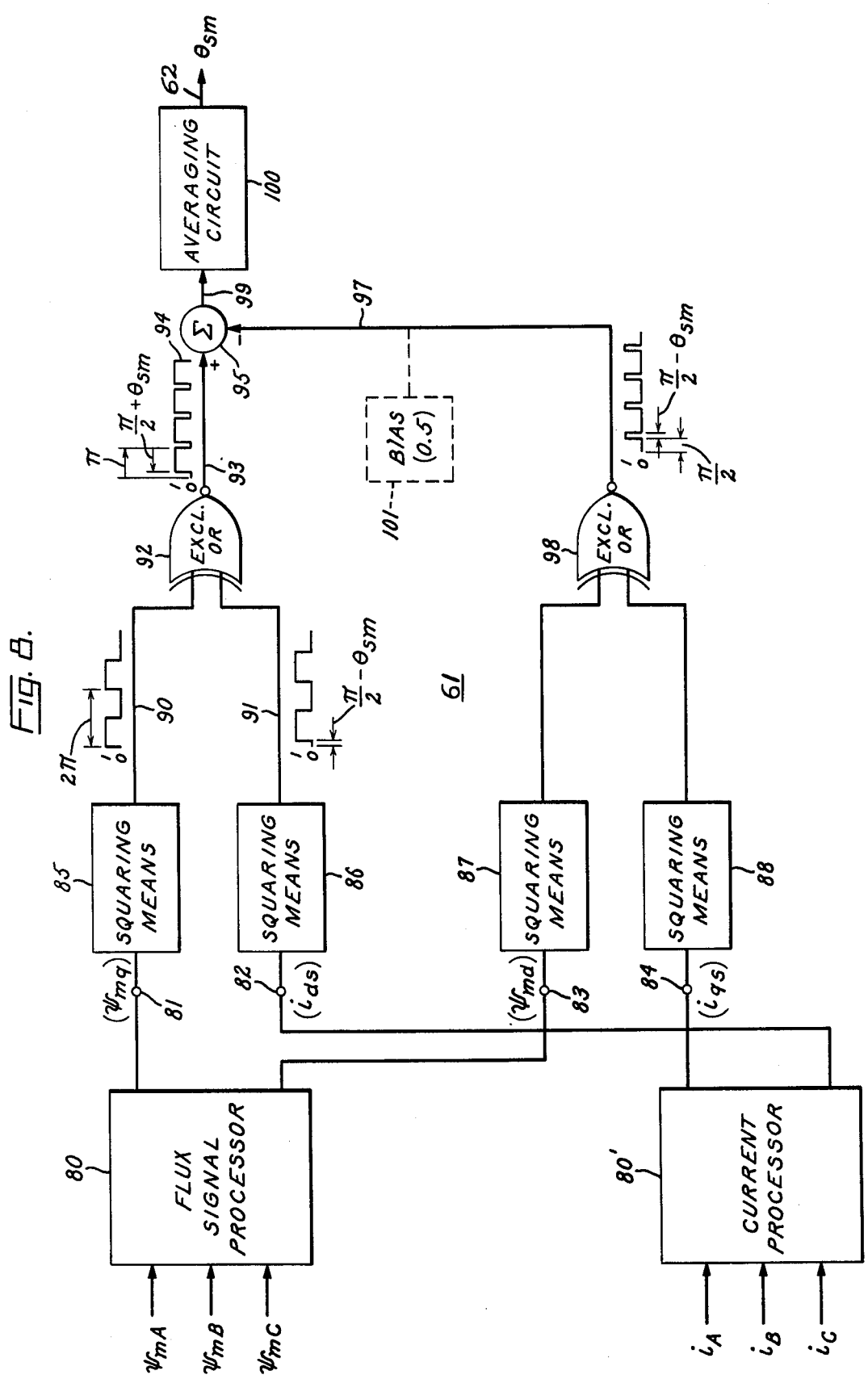
FIG. 8 is a schematic diagram of an angle feedback signal deriving circuit shown as a single block in the FIG. 1 embodiment of the present invention.

FIG. 8 illustrates one arrangement of the angle processing circuit means 61 for deriving a signal representative of the phase angle $\theta_{sm}$. This angle processor is specifically included in the a-c motor stabilizing scheme that is claimed hereinafter. It has four input terminals 81, 82, 83, and 84 supplied with signals derived by actual flux signal processing circuit means 80 and by stator current signal processing circuit means 80'. The latter two means are respectively adapted to be connected to the flux sensors 58 and to the current transformers 57 (FIG. 1), and they are suitably constructed and arranged (see components 115, 117, 120, and 122 in FIG. 9, for example) to supply to the respective terminals 81, 82, 83, and 84 first, second, third, and fourth periodic input signals that are respectively representative of the following motor quantities: $\psi_{mq} = \psi_{mA} = \Psi_{mA} \sin\omega t$ $$i_{ds} = \frac{i_C - i_B}{\sqrt{3}} \approx \frac{1}{2}(I_B + I_C)\sin(\omega t + \theta_{sm} + \frac{\pi}{2}) + \frac{1}{2\sqrt{3}}(I_B - I_C)\sin(\omega t + \theta_{sm})$$

$$\psi_{md} = \frac{\psi_{mC} - \psi_{mB}}{\sqrt{3}} = \frac{1}{2}(\psi_B + \psi_C)\sin(\omega t + \frac{\pi}{2}) + \frac{1}{2\sqrt{3}}(\psi_B - \psi_C)\sin\omega t$$

$$i_{qs} = i_A \approx I_A\sin(\omega t + \theta_{sm})$$

It will be apparent that the first and third input signals are synchronized, respectively, with the fundamental components of the actual flux produced across the stator-rotor gap in the effective q and d axes of the stator. Similarly, the second and fourth input signals are synchronized, respectively, with the fundamental stator winding currents in the $d$ and $q$ axes of the stator. In steady-state operation, the system is balanced, the gap flux associated with each phase has the same peak magnitude $\Psi_{mA}$, and the respective phase currents in the stator windings have equal peak magnitudes $I_A$, whereby the second and third quantities in the above table reduce to $I_A \sin\omega t + \theta_{sm} + \pi/2$ ) and $\Psi_{mA} \sin(\omega t + \pi/2)$, respectively. Thus the angle of interest is the "complement" of the fundamental electrical phase displacement between the pair of first and second input signals supplied to the terminals 81 and 82 or between the pair of third and fourth input signals supplied to the terminals 83 and 84. By complement we mean the angle by which the actual phase displacement differs (either more or less) from 90°.

The four periodic input signals that are supplied to the input terminals 81–84 of the FIG. 8 angle processor are individually amplified and limited by means 85, 86, 87, and 88 for producing square-wave signals in phase with the fundamental components of the respective input signals. The respective output lines 90 and 91 of the first pair of squaring means 85 and 86 are connected to an associated pair of input terminals of a logic component 92 that produces on a line 93 a first train 94 of discrete signals indicative of the electrical phase displacement between the squared signals on lines 90 and 91. Preferably the train 94 comprises a series of "1" signals having a constant amplitude, a frequency that varies with the fundamental stator winding excitation frequency, and a duration that depends on the phase angle between the squared signals on lines 90 and 91. If, as is illustrated in FIG. 8, the logic component 92 comprises an "exclusive or" circuit, each of the "0" spaces between consecutive "1" signals in the train 94 has an angular duration equal to the phase displacement between the periodic signals that are supplied to the first and second input terminals 81 and 82, and each of the "1" signals has an angular duration equal to the supplement of that phase displacement.

The line 93 from the logic component 92 is connected to summing means 95 where the first signal train 94 is preferably combined with a second train 96 of discrete signals provided on a line 97. The second signal train 96 is produced by another logic component 98 having input terminals respectively connected to the output lines of the second pair of squaring means 87 and 88, whereby the second train 96 is similar to the first train 94 except that the angular duration of each of the "0" spaces between consecutive "1" signals in the train 96 coincides with the phase displacement between the third and fourth periodic inputs signals from which this train is produced. The summing means 95 is operative in response to the signals on the two lines 93 and 97 to produce on a line 99 a resultant signal equal to their difference. A suitable filter 100 is connected to the line 99 for producing an output signal (the angle feedback signal $\theta_{sm}$) that varies with the average value of the resultant signal on the line 99, which value in turn is determined by the complement of the phase displacement between the paired input signals (i.e., the angle by which the indicated phase displacement differs from 90°).

It will be apparent that if the paired input signals are just 90° out of phase ($\theta_{sm}=0$), the durations of the "1" signals in both of the signal trains 94 and 96 are 90°, whereby the average value of the resultant signal on line 99 (and hence the output signal of the averaging circuit 100) is zero. The same result is properly obtained if the amplitude of either one of an input signal pair is so small that the associated squaring means has a negligible output. When the paired input signals are in phase with one another ($\theta_{sm} = +90°$), the resultant signal on line 99 is continuously $+1$ and the output signal has a maximum positive magnitude. On the other hand, when the paired input signals are 180° out of phase ($\theta_{sm} = -90°$), the resultant signal on line 99 is continuously $-1$ and the output signal has a maximum negative magnitude. In effect the logic components 92 and 98, the summing means 95, and the averaging circuit 100 cooperate to perform a phase discriminating function.

The above-described angle processor lends itself well to digital implementation. It is preferably arranged to respond to both pairs of the four periodic input signals in order to optimize the accuracy and speed of transient response and to increase the smoothness of the angle feedback signal. However, an equally accurate steady-state indication of the angle $\theta_{sm}$ could alternatively be obtained by replacing the second train 96 of discrete signals with a continuous bias signal having one-half the magnitude of the "1" signals in the first train 94, for which purpose the line 97 could be connected to a suitable bias source 101 shown dotted in FIG. 8. In this case the excursion of the angle processor output signal on line 62 would be reduced 50%.

Figure 9:
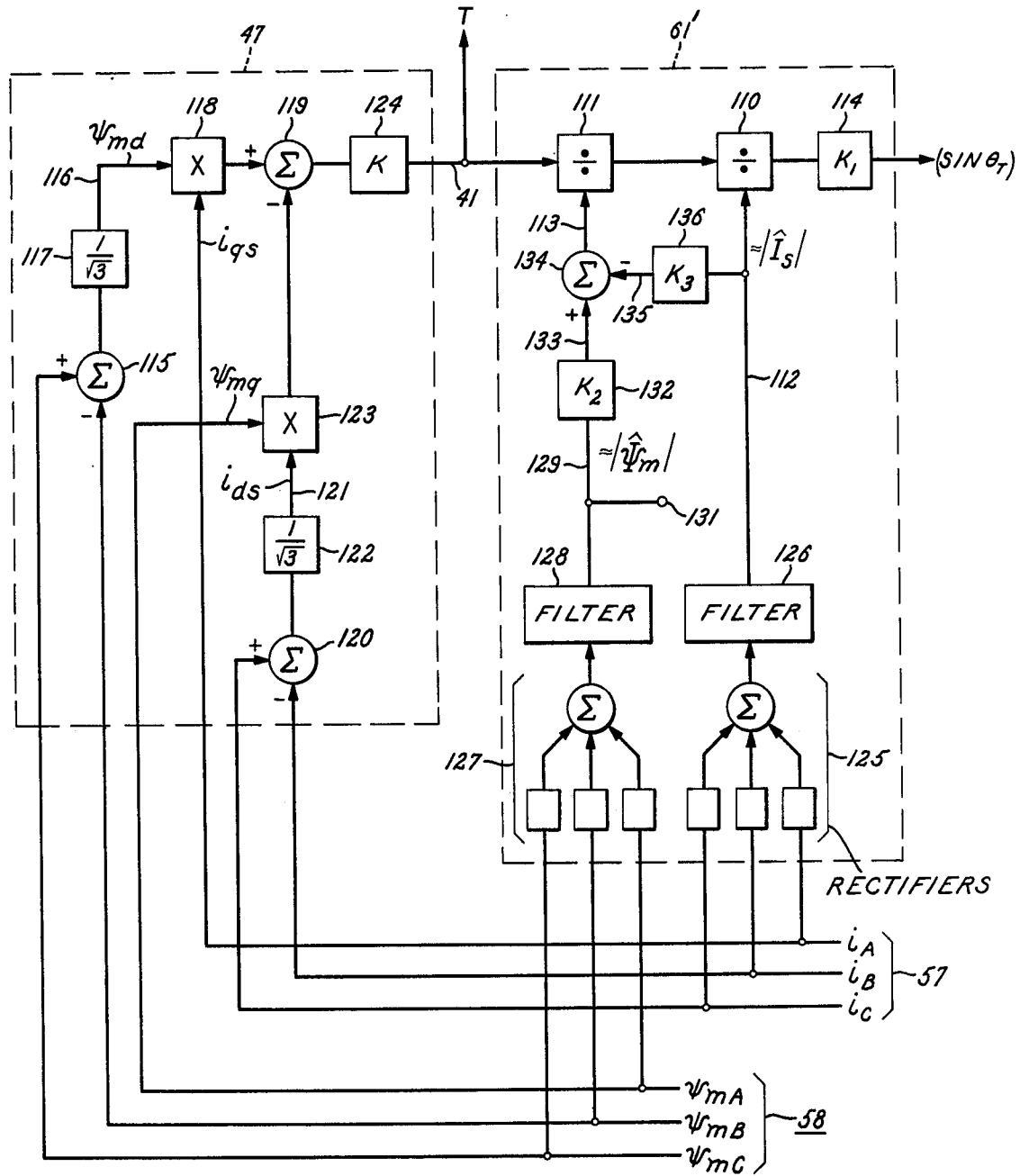
FIG. 9 is a schematic diagram of another angle feedback signal deriving circuit that is also useful in the motor drive system illustrated in FIG. 1.

A different arrangement for deriving a feedback signal representative of the angle $\theta_s$ is illustrated in FIG. 9. (The use of this arrangement in a motor stabilizing scheme is claimed in the above-referenced application Ser. No. 729,042. ) In essence it comprises a suitable torque processing circuit for deriving a torque feedback signal representative of the magnitude and relative direction of the actual motor torque T, in combination with angle processing means 61' connected to the torque processor and arranged to produce an output signal having a value that varies directly with the value of the torque feedback signal but inversely with the value of each of two signals respectively representative of the magnitudes of current and flux that interact in the motor to produce torque. It will be apparent that the value of such an output signal depends on the sine of the actual torque angle.

The torque processor in the FIG. 9 combination is shown in the dotted box 47, and it is advantageously constructed and arranged according to the teachings of the above-referenced co-pending patent application Ser. No. 568,120 - Plunkett. Its output is connected via the line 41 to the angle processor 61' in which two dividers 110 and 111 are provided for dividing the torque feedback signal respectively by a first signal on a line 112 and by a second signal on a line 113. Preferably the first signal on line 112 is proportional to the magnitude of the stator current vector $\bar{I}_s$ and the second signal on line 113 is representative of the magnitude of the stator-rotor gap flux vector $\bar{\Psi}_m$. The tandem dividers 110 and 111 are connected through a constant gain circuit 114 to an output line of the angle processor 61'. The gain $K_1$ of the circuit 114 preferably is $(3\omega_b/4P)$ which is the reciprocal of the constant K in the motor torque equations set forth above. Before describing this version of the angle processor in more detail, the illustrated torque processor 47 will be briefly recapitulated.

As in indicated in FIG. 9, the torque processor 47 comprises current signal processing circuit means that receives from the current transformers 57 a set of three a-c feedback signals respectively representative of the actual currents $i_A$, $i_B$, and $i_C$ in the three different phases of the stator windings, and it also comprises flux signal processing circuit means that receives from the flux sensors 58 three a-c feedback signals respectively representative of the actual flux $\psi_{mA}$, $\omega_{mB}$ and $\omega_{mC}$ across the stator-rotor gap adjacent to the three flux sensing coils 71, 72, and 73 (FIG. 1). The phases B and C flux feedback signals are combined in a summing circuit 115, and their difference is fed to a line 116 through a constant gain circuit 117 that introduces the $(1/\sqrt{3})$ proportionality constant, whereby the a-c signal on line 116 is representative of the direct axis motor flux $\psi_{md}$. The line 116 is connected to a multiplier 118 where the latter signal is multiplied with the phase A current feedback signal (representative of the quadrature axis stator current $a_{qs}$), and the product ($\psi_{md}i_{qs}$) of this multiplication is supplied as a first of two inputs to a summing circuit 119. Similarly, the phases B and C current feedback signals are combined in a summing circuit 120, and their difference is fed to a line 121 through a constant gain circuit 122 that introduces the $(1/\sqrt{3})$ proportionality constant, whereby the a-c signal on line 121 is representative of the direct axis stator current $i_{ds}$. The line 121 is connected to a multiplier 123 where the latter signal is multiplied with the phase A flux feedback signal (representative of the quadrature axis motor flux $\psi_{mq}$), and the product ($\psi_{mq}i_{ds}$) of this multiplication is supplied as the other input to the summing circuit 119. In the summing circuit 119 the product outputs of the two multipliers 118 and 123 are summed together to derive a resultant signal proportional to their difference and the resultant signal is supplied through a constant gain (K) circuit 124 to the output line 41.

It can be shown that the outputs of the two multipliers 118 and 123 in the torque processor 47 are a-c quantities consisting of the same double frequency components and oppositely poled d-c components that are proportional to motor torque, whereby the value (magnitude and sign) of their difference is a true measure of the electromagnetic torque T developed in the motor. In other words, the torque feedback signal on the line 41 will vary with the cross product of the stator current vector $\hat{I}_s$ and the stator-rotor gap flux vector $\hat{\Psi}_m$. By dividing the torque feedback signal (T) on line 41 by both the stator current magnitude representative signal on line 112 and the gap flux magnitude representative signal on line 113, the angle processing circuit 61' effectively normalizes the torque feedback signal and hence derives at its output a signal representative of the sine of the phase angle ($\theta_{sm}$) between the vectors $\hat{I}_s$ and $\hat{\Psi}_m$.

Preferably the angle processor 61' includes suitable rectifying and summing circuit means 125 coupled by way of the current transformers 57 to all three phases of the stator windings and connected through a filter 126 to the line 112 for supplying to the divider 110 a signal that represents the average magnitude of alternating current in the stator windings. The average magnitude of stator current is a close approximation of the magnitude of the stator current vector $\hat{I}_s$. As is shown in FIG. 9, the angle processor 61' also includes rectifying and summing circuit means 127 responsive to all three flux feedback signals from the flux sensors 58 and connected through a filter 128 to a line 129 for deriving on the latter line a signal that represents the average magnitude of flux produced across the stator-rotor gap in the motor. The average magnitude of the gap flux is a close approximation of the magnitude of the mutual flux vector $\hat{\Psi}_m$. Note that the true magnitude of the current or the flux vector could be obtained if desired by utilizing means for deriving the square root of the sum of the squares of the respective direct and quadrature axes components of the relevant quantity. Ideally such means will give a smoother feedback signal, assuming sinusoidal direct and quadrature components. If desired, the flux magnitude signal on line 129 can be used as the excitation magnitude feedback signal for the first outer regulating loop 30 of the motor drive system, in which case the terminal 31 shown in FIG. 1 would be connected to a terminal 131 joined to the line 129 as shown in FIG. 9.

If the flux magnitude signal on line 129 were supplied directly to the divider 111 in the angle processing circuit 61', the output of this circuit would be a true measure of $\sin\theta_{sm}$. The interrelationship of the torque magnitude and the sin $\theta_{sm}$ has been shown in FIG. 7 where it will be observed that the latter quantity is a double valued function of torque when the motor slip frequency increases from a low value torward breakdown. In motor drive systems that are intended to operate over a wide range of speed and loads the improved angle regulating scheme will perform its stabilizing function more successfully if a monotonic relationship is maintained between torque and angle. Toward this end, the FIG. 9 embodiment of the angle processor includes between the lines 129 and 113 a constant gain circuit 132 connected via a line 133 to one input of a summing point 134 where the flux magnitude signal is algebraically summed with a compensating signal derived from the current magnitude signal on line 112 to which a second input of the summing point 134 is connected over a line 135 and another constant gain circuit 136.

The flux magnitude signal on the line 133 will vary with the average magnitude of stator-rotor gap flux, being related thereto by the gain $K_2$ of the circuit 132. The compensating signal on the line 135 is a predetermined fraction of the average magnitude of stator current, being related thereto by the gain $K_3$ of the circuit 136, which gain is chosen to yield the desired monotonic relationship and typically is quite low (e.g., of the order of 0.05). The compensating signal is subtracted from the flux magnitude signal at the summing point 134, and the difference comprises a compensated flux magnitude signal appearing on the line 113. As a rsult of using this compensated signal as the divisor for the divider 111 in the angle processor 61', the angle feedback signal on the output line of this processor actually varies with the sine of an equivalent torque angle $\theta_T$ that has a desirable monotonic relationship to torque, as is shown by the trace labeled "$\sin\theta_T$" in FIG. 7. It can be observed in FIG. 7 that the equivalent torque angle $\theta_T$ is virtually the same as the phase angle $\theta_{sm}$ for the relatively low values of slip frequency in the normal operating range of an induction motor (e.g., below approximately one Hertz for the typical motor whose characteristics are displayed in FIG. 7). Consequently when the motor drive system is operating at torque levels up to and including rated load, the essential inverter synchronization of the improved stabilizing scheme is retained, and when the system is operating at higher torques approaching the pull-out torque level regulation problems due to double valued angles are avoided.

In order to obtain a meaningful angle feedback signal at start-up or under abnormal operating conditions, the dividers 110 and 111 in the embodiment of the angle processor shown in FIG. 9 should be equipped with non-linear limiters that set appropriate minimum divisor values so as to avoid division by zero. To avoid loss of the angle feedback signal when the motor is operating at zero torque, the command signal for the excitation magnitude regulating loop 30 of the motor drive system has a predetermined minimum limit that will prevent a zero flux condition, for which purpose we provide the previously described limiter 39 (FIG. 1).

The present invention has utility in a wide range of motor drive applications. It can be used with a variety of outer regulating loops different that the exemplary ones illustrated in FIG. 1. It is useful in a voltage fed motor drive system to keep the inverter firing pulses aligned at the correct phase with respect to the motor flux, thereby permitting a stepless transition between braking and motoring modes (such as shown in FIG. 5) without a transient.

While a specific embodiment of our invention has been shown and described by way of illustration, various modifications will probably occur to those skilled in the art. We therefore intend, by the concluding claims, to cover all such modifications as fall within the true spirit and scope of the invention.

What we claim as new and desire to secure by Letters Patent of the United States is:

1. An improved stabilizing scheme for an a-c electric motor comprising a stator and a rotor, said stator having effective direct and quadrature axes and said rotor being spaced from said stator by a gap, said motor being provided with a source of excitation comprising electric power conversion apparatus connected by way of electric current conductors to windings on said stator, wherein the improvement comprises:
   a. means coupled to said motor and effective when the motor is excited for deriving a first periodic signal synchronized with the fundamental component of the actual flux produced across said stator-rotor gap in a predetermined one of said stator axes;
   b. means coupled to at least a first one of said conductors for deriving a second periodic signal synchronized with the fundamental stator winding current in the other stator axis;
   c. phase discriminating means responsive to said first and second periodic signals for producing an angle feedback signal representative of the complement of the electrical phase displacement between said periodic signals; and
   d. means responsive to said angle feedback signal for controlling the motor excitation as a function of said angle feedback signal.

2. An improved regulating scheme for a motor as set forth in claim 1 comprising the improvement of claim 1 and further comprising means for providing a command signal representative of a desired phase angle, said motor excitation controlling means being arranged to vary motor excitation as necessary to minimize any differnce between said angle feedback signal and said command signal.

3. The improved regulating scheme as set forth in claim 2 for an adjustable speed a-c motor the excitation source of which comprises electric power conversion apparatus adapted to supply a-c power of variable frequency to the stator windings, wherein said motor excitation controlling means controls said conversion apparatus and responds to any non-minimum difference between said angle feedback signal and said command signal so as to vary, in a corrective sense, the frequency of a-c power supplied to said stator windings.

4. The improvement as set forth in claim 1 for an a-c motor th excitation source of which comprises electric power conversion apparatus adapted to supply polyphase a-c power of variable frequency to the stator windings and further comprising means coupled to said motor for deriving a third periodic signal synchronized with the fundamental component of the actual flux produced across said stator-rotor gap in said other stator axis, and means coupled to at least another one of said conductors for deriving a fourth periodic signal synchronized with the fundamental stator winding current in said predetermined one axis, said hase discriminating means being additionally responsive to said third and fourth periodic signals.

5. The improvement as set forth in claim 4 wherein said phase discriminating means comprises means supplied with said first and second periodic signals for producing a first train of discrete signals indicative of the electrical phase displacement therebetween, means supplied with said third and fourth periodic signals for producing a second train of discrete signals indicative of the electrical phase displacement therebetween, and means responsive to both of said first and second trains of signals for deriving said angle feedback signal.

6. The improvement as set forth in claim 5 wherein the signals in said first and second trains have equal constant amplitudes, equal frequencies that vary with the fundamental stator winding excitation frequency, and durations that depend on the phase displacement between the periodic signals from which they are respectively produced, and wherein the last-mentioned means comprises summing means responsive to said first and second trains of signals for producing a resultant signal equal to their difference and means connected to said summing means for producing a signal (which is said angle feedback signal) that varies with the average value of said resultant signal.

7. The improvement as set forth in claim 1 for an adjustable speed a-c motor the excitation source of which comprises electric power conversion apparatus adapted to supply polyphase a-c power of variable frequency to the stator windings, wherein said hase discriminating means comprises means for producing a train of discrete signals indicative of the electrical phase displacement between said first and second periodic signals and means responsive to said train of signal for deriving said angle feedback signal.

8. The improvement of claim 7 wherein the signals in said train of signals have a constant amplitude, a frequency that varies with the fundamental stator winding excitation frequency, and a duration that depends on said phase displacement.

9. An improved method of stabilizing an a-c electric motor comprising a stator having windings adapted to be coupled to a source of variable frequency excitation and a rotor spaced from said stator by a gap, wherein the improvement comprises the steps of:
   a. sensing the actual flux produced across said stator-rotor gap when the motor is excited;
   b. sensing the actual current in the stator windings of the motor;
   c. deriving from the sensed flux and current respective direct and quadrature axes flux signals $\psi_{md}$ and $\psi_{mq}$ and respective direct and quadrature axes current signals $i_{ds}$ and $i_{qs}$;
   d. pairing said current signal $i_{ds}$ with said flux signal $\psi_{mq}$ and said current signal $i_{qs}$ with said flux signal $\psi_{md}$;

e. obtaining from at least one pair of signals an indication of the electrical phase displacement therebetween;

f. determining the angle by which the indicated phase displacement differs from 90°; and g. controlling the motor excitation as a function of said angle.

10. An improved regulating scheme for an adjustable speed a-c electric motor comprising a stator and a rotor and provided with a source of excitation comprising electric power conversion apparatus that supplies a-c power of variable frequency and amplitude to said stator, said motor being capable of developing electromagnetic force tending to move the rotor relative to the stator due to the interaction of current and flux in the motor when excited, wherein the improvement comprises:

a. first means coupled to said motor for deriving an angle feedback signal representative of the actual phase angle between said interacting current and flux of the motor when excited;

b. second means responsive to said angle feedback signal for controlling the motor excitation as a function of said angle feedback signal;

c. third means for providing a variable command signal, said third means for including means for preventing any deviation of said command signal below a predetermined minimum limit; and d. fourth means responsive to said comman signal for controlling said conversion apparatus so as to control the amplitude of a-c power supplied to said stator as a function of said command signal.

11. The improvement as set forth in claim 10 wherein said second means is arranged to control said conversion apparatus in a manner that controls the frequency of a-c power supplied to said stator.

12. The improvement as set forth in claim 10 wherein there is provided an excitation magnitude feedback signal representative of the level of excitation in the stator of said motor, and wherein said fourth means is arranged to vary the amplitude of a-c power supplied to said stator as necessary to minimize any difference between said excitation magnitude feedback signal and said command signal.

13. The improvement as set forth in claim 12 and further comprising means for providing another command signal representative of the desired phase angle, said second means being arranged to vary motor excitation as necessry to minimize any difference between said angle feedback signal and said last-mentioned command signal.

14. The improvement of claim 10 wherein said conversion apparatus comprises a controlled d-c power supply having d-c terminals across which voltage of variable average magnitude is impressed, a variable frequency static electric power inverter having d-c and a-c terminal sets, and means including a current smoothing filter for interconnecting the d-c terminals of said power supply and the d-c terminal set of said inverter, windings on the stator of said motor being connected to the a-c terminal set of said inverter, whereby said stator windings are excited by alternating current of variable frequency and amplitude, said second means being arranged to control the operating frequency of said inverter and hence the frequency of current that excites said stator windings, and said fourth means being arranged to control the average magnitude of said voltage and hence the amplitude of the alternating current exciting said stator windings.

* * * * *

UNITED STATES PATENT AND TRADEMARK OFFICE
CERTIFICATE OF CORRECTION

PATENT NO. : 4,088,935
DATED : May 9, 1978
INVENTOR(S) : JD D'Atre et al

It is certified that error appears in the above-identified patent and that said Letters Patent are hereby corrected as shown below:

Column 5, line 36, delete "$\theta 0_{sm}$" and substitute -- $\theta^*_{sm}$ --

Column 8, line 3, delete "$\omega_{md}$" and substitute -- $\psi_{md}$ --

Column 8, line 26, delete $\theta_{xm}$" and substitute -- $\theta_{sm}$ --

Column 8, line 40, delete "1"

Column 9, line 3, correct the equation to -- $K(\psi_{md}i_{qs} - \psi_{mq}i_{ds})$ --

Column 9, line 3, delete "$30/4\psi_b$" and substitute -- $3P/4\omega_b$ --

Column 10, line 56, delete "$107_{s1}$" and substitute -- $\omega_{s1}$ --

Column 12, lines 59-60, correct the equation to --

$$\psi_{md} = \frac{\psi_{mC} - \psi_{mB}}{\sqrt{3}} = \frac{1}{2}(\Psi_B + \Psi_C)\sin(\omega t + \frac{\pi}{2}) + \frac{1}{2\sqrt{3}}(\Psi_B - \Psi_C)\sin\omega t \quad --$$

Column 12, line 63, third equation which starts "$i_{qs}$" should start at left margin and read -- $i_{qs} = i_A - I_A \sin(\omega t + \theta_{sm})$ --

Column 13, line 8, first equation should read --
$I_A \sin(\omega t + \theta_{sm} + \frac{\pi}{2})$ --

Column 14, line 29, delete "$\theta_s$" and substitute -- $\theta_{sm}$ --

Column 15, line 1, delete "$c_C$" and substitute -- $i_C$ --

UNITED STATES PATENT AND TRADEMARK OFFICE
CERTIFICATE OF CORRECTION

PATENT NO. : 4,088,935
DATED : May 9, 1978
INVENTOR(S) : JD D'Atre et al

It is certified that error appears in the above-identified patent and that said Letters Patent are hereby corrected as shown below:

Column 15, line 5, delete "$\omega_{mB}$ and $\omega_{mC}$" and substitute -- $\psi_{mB}$, and $\psi_{mC}$ --

Column 15, line 16, delete "$a_{qs}$" and substitute -- $i_{qs}$ --

Column 15, line 26, delete "$\psi_{mg}$" and substitute -- $\psi_{mq}$ --

Column 18, line 2, delete "th" and substitute -- the --

Column 18, line 12, delete "hase" and substitute -- phase --

Column 18, line 42, delete "hase" and substitute -- phase --

Column 18, line 46, delete "signal" and substitute -- signals --

Column 19, line 1, insert "said" between "of" and "signals"

Column 19, line 27, delete "for" (first occurrence)

Column 19, line 31, delete "comman" and substitute -- command --

Signed and Sealed this

Fourteenth Day of November 1978

[SEAL]

Attest:

RUTH C. MASON
Attesting Officer

DONALD W. BANNER
Commissioner of Patents and Trademarks